United States Patent
Zhang et al.

(10) Patent No.: US 9,537,622 B2
(45) Date of Patent: *Jan. 3, 2017

(54) USER EQUIPMENT, METHOD, AND SYSTEM FOR DETERMINING, REPORTING, DISTRIBUTING RESOURCE FOR MULTIPLE CARRIERS

(71) Applicant: HUAWEI TECHNOLOGIES CO., LTD., Shenzhen (CN)

(72) Inventors: Yi Zhang, Shanghai (CN); Jie Ma, Beijing (CN); Haidan Wang, Shanghai (CN); Chuanfeng He, Beijing (CN); Cunfei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,995

(22) Filed: May 7, 2014

(65) Prior Publication Data
US 2014/0301314 A1 Oct. 9, 2014

Related U.S. Application Data

(63) Continuation of application No. 13/728,231, filed on Dec. 27, 2012, now Pat. No. 8,761,113, and a (Continued)

(30) Foreign Application Priority Data

Dec. 10, 2008 (CN) .......................... 2008 1 0219859

(51) Int. Cl.
*H04L 5/00* (2006.01)
*H04W 72/04* (2009.01)
(Continued)

(52) U.S. Cl.
CPC ............... *H04L 5/003* (2013.01); *H04L 5/001* (2013.01); *H04L 5/0042* (2013.01);
(Continued)

(58) Field of Classification Search
CPC ........ H04L 5/001; H04L 5/003; H04L 5/0042; H04L 5/0046; H04L 12/26; H04W 24/00; H04W 72/00; H04W 72/0453; H04W 72/04

See application file for complete search history.

(56) References Cited

U.S. PATENT DOCUMENTS 6,081,697 A * 6/2000 Haartsen ........................ 455/109
2004/0219920 A1 11/2004 Love et al.
(Continued)

FOREIGN PATENT DOCUMENTS

CN 1536794 A 10/2004
CN 1622657 A 6/2005
(Continued)

OTHER PUBLICATIONS

U.S. Appl. No. 60/588,975, filed Jul. 19, 2004, Balasubramanian et al.
(Continued)

*Primary Examiner* — Ian N Moore
*Assistant Examiner* — Mewale Ambaye
(74) *Attorney, Agent, or Firm* — Staas & Halsey

(57) ABSTRACT

A method, a user equipment (UE) and a communication system are provided. In the disclosure, a UE configured with multiple carriers determines whether a first, a second, and a third conditions are met, and then determines whether resources allocated for the UE on the carrier are sufficient or not accordingly. The first condition defines that the UE is transmitting as much scheduled data as allowed by a current service grant on the carrier. The second condition indicates
(Continued)

that the UE has enough transmission power available to transmit data at higher data rate on the carrier. The third condition indicates total buffer data requires more than a preconfigured time period to be transmitted through the carrier together with at least one of other carriers among the multiple carriers.

25 Claims, 5 Drawing Sheets

Related U.S. Application Data continuation of application No. 13/156,613, filed on Jun. 9, 2011, now Pat. No. 9,178,671, which is a continuation of application No. PCT/CN2009/075247, filed on Dec. 1, 2009.

(51) Int. Cl.
   *H04W 72/00* (2009.01)
   *H04W 24/00* (2009.01)
(52) U.S. Cl.
   CPC .......... *H04L 5/0046* (2013.01); *H04W 72/00* (2013.01); *H04W 72/04* (2013.01); *H04W 72/0453* (2013.01); *H04W 24/00* (2013.01)

(56) References Cited

U.S. PATENT DOCUMENTS

| | | |
|---|---|---|
| 2005/0265222 A1 | 12/2005 | Gerlach |
| 2006/0013182 A1 | 1/2006 | Balasubramanian et al. |
| 2006/0176811 A1 | 8/2006 | Yang et al. |
| 2006/0221894 A1 | 10/2006 | Casaccia et al. |
| 2007/0109964 A1 | 5/2007 | Kwak et al. |
| 2007/0147526 A1 | 6/2007 | Kim et al. |
| 2007/0297360 A1 | 12/2007 | Joachim et al. |
| 2008/0101288 A1 | 5/2008 | Wan |
| 2009/0097444 A1* | 4/2009 | Lohr et al. .................... 370/329 |
| 2009/0270820 A1 | 10/2009 | Johnson et al. |
| 2010/0111023 A1* | 5/2010 | Pelletier et al. .............. 370/329 |
| 2011/0111023 A1 | 5/2011 | Buschard et al. |
| 2013/0136077 A1 | 5/2013 | Zhang et al. |

FOREIGN PATENT DOCUMENTS

| | | |
|---|---|---|
| CN | 1694557 A | 11/2005 |
| CN | 1819674 | 8/2006 |
| CN | 1905549 A | 1/2007 |
| CN | 101114857 A | 1/2008 |
| CN | 101166054 A | 4/2008 |
| CN | 101176379 A | 5/2008 |
| CN | 101185260 A | 5/2008 |
| CN | 100425087 C | 10/2008 |
| CN | 101288247 A | 10/2008 |
| CN | 101651611 A | 2/2010 |
| CN | 101754394 B | 1/2012 |
| EP | 1971096 | 9/2008 |
| EP | 1986455 | 10/2008 |
| GB | 2448762 | 10/2008 |
| KR | 10-2007-0040693 | 4/2007 |
| WO | 2007-003117 A1 | 1/2007 |
| WO | WO 2010/051513 A2 | 5/2010 |

OTHER PUBLICATIONS

U.S. Appl. No. 61/117,851, filed Nov. 25, 2008, Cave et al.
Document RP-081123, "3GPP Work Item Description, Multi-carrier evolution, MC-RAN"; 3 GPP TSG RAN #42, Dec. 2-5, 2008, Prague, Czech Republic; (5 pages).
Document RP-081142, "3GPP Work Item Description, Multi-carrier HSPA evolution, MC-HSPA"; 3GPP TSG RAN #42, Dec. 2-5, 2008, Prague, Czech Republic; (5 pages).
Document RP-081114, "Work Item Description, Multi-carrier evolution"; 3GPP TSG RAN #42, Dec. 2-5, 2008, Prague, Czech Republic; (4 pages).
Change Request, 25.321 CR Draft; 3GPP TSG-RAN WG2 Meeting #53; Shanghai, China, May 8-12, 2006; R2-061111; (4 pages).
Notice of Opposition dated Jul. 22, 2014 in related European Patent Application No. 09831447.9 (6 pages).
Notice of Allowance dated Nov. 14, 2012 in related Korean Patent Application No. 10-2011-7015131 (2 pages) (1 page English Translation).
3GPP TS 25.331 V8.4.0 (Sep. 2008); Technical Specification, $3^{rd}$ Generation Partnership Project; Technical Specification Group Radio Access Network; Medium Access Control (MAC) protocol specification (Release 8); (1,543 pages).
$3^{rd}$ Generation Partnership Project; Technical Specification Group Radio Access Network; Enhanced uplink; Overall description; Stage 2 (Release 8); 3GPP TS 25.319 V8.3.0 (Sep. 2008); (62 pages).
3GPP TSG-WG2 Meeting #64, "Change Request", R2-086121, Nov. 2008, 2 pages.
Extended European Search Report issued Sep. 7, 2012 in corresponding European Patent Application No. 09831447.9.
3 GPP TS 25.321 V5.14.0, "$3^{rd}$ Generation Partnership Project; Technical Specification Group Radio Access Network; Medium Access Control (MAC) protocol specification," Release 5, Sep. 2008, pp. 1-58.
3GPP TS 25.321, V6.16.0, "$3^{rd}$ Generation Partnership Project; Technical Specification Group Radio Access Network; Medium Access Control (MAC) protocol specification," Release 6, Sep. 2008, pp. 1-94.
3 GPP TS 25.321 V7.10.0 "$3^{rd}$ Generation Partnership Project; Technical Specification Group Radio Access Network; Medium Access Control (MAC) protocol specification," Release 7, Sep. 2008, pp. 1-147.
3 GPP TS 25.321 V8.3.0, "$3^{rd}$ Generation Partnership Project; Technical Specification Group Radio Access Network; Medium Access Control (MAC) protocol specification," Release 8, Sep. 2008, pp. 1-167.
3 GPP TS 25.321 V9.0.0, "$3^{rd}$ Generation Partnership Project; Technical Specification Group Radio Access Network; Medium Access Control (MAC) protocol specification," Release 9, Sep. 2008, pp. 1-187.
International Search Report, mailed Mar. 11, 2010, in International Application No. PCT/CN2009/075247 (4 pp.).
Written Opinion of the International Searching Authority mailed Mar. 11, 2010 in corresponding International Patent Application PCT/CN2009/075247.
Chinese Office Action issued May 5, 2011 in corresponding Chinese Patent Application 200810219859.6.
Non-Final Office Action, dated Apr. 1, 2013 in parent U.S. Appl. No. 13/728,231 (17 pp.).
Final Office Action mailed Sep. 27, 2013 in parent U.S. Appl. No. 13/728,231 (24 pp.).
Chinese Search Report dated Oct. 25, 2013 in corresponding Chinese Patent Application No. 2012100041483 (2 pages).
Chinese Office Action dated Nov. 4, 2013 in corresponding Chinese Patent Application No. 201210004148.3 (3 pages).
"Dual Carrier EGPRS for GERAN evolution"; AHGEV-009, 3GPP TSG GERAN adhoc on GERAN Evolution Meeting No. 1, Copenhagen, Denmark, May 18-19, 2005; pp. 1-7.
Extended European Search Report dated Dec. 16, 2013 in corresponding European Patent Application No. 13182712.3 (6 pages).
Notice of Allowance mailed Feb. 12, 2014 in parent U.S. Appl. No. 13/728,231 (14 pages).
Office Action dated Mar. 14, 2013 in related U.S. Appl. No. 13/156,613 (38 pp.).
Non-Final Office dated Apr. 10, 2014 in related U.S. Appl. No. 13/156,613 (27 pp.).
Final Office Action dated Sep. 27, 2013 in related U.S. Appl. No. 13/156,613 (21 pp.).
Final Office Action dated Aug. 27, 2014 in parent U.S. Appl. No. 13/156,613 (26 pages).

(56) References Cited

OTHER PUBLICATIONS

Notice of Allowance mailed Jun. 17, 2015 in parent U.S. Appl. No. 13/156,613 (10 pages).
"*Newton's Telecom Dictionary*"; 25$^{th}$ Updated and Expanded Anniversary Edition, Harry Newton, New York, 2009, total 5 pages.
U.S. Appl. No. 13/728,231, filed Dec. 27, 2012, Zhang et al., Huawei Technologies Co., Ltd. Shenzhen, P.R. China.
U.S. Appl. No. 13/156,613, filed Jun. 9, 2011, Zhang et al., Huawei Technologies Co., Ltd. Shenzhen, P.R. China.

\* cited by examiner

USER EQUIPMENT, METHOD, AND SYSTEM FOR DETERMINING, REPORTING, DISTRIBUTING RESOURCE FOR MULTIPLE CARRIERS

CROSS-REFERENCE TO RELATED APPLICATIONS

This application is a continuation of U.S. patent application Ser. No. 13/728,231, filed on Dec. 27, 2012, which is a continuation of U.S. patent application Ser. No. 13/156,613, filed on Jun. 9, 2011, which is a continuation of International Application No. PCT/CN2009/075247, filed on Dec. 1, 2009, which claims priority to Chinese Patent Application No. 200810219859.6, filed on Dec. 10, 2008. All of the aforementioned applications are hereby incorporated by reference in their entireties.

FIELD OF THE INVENTION

The present invention relates to the field of communications technologies, and in particular, to a User Equipment (UE), a method for determining a resource, a method for reporting a resource, and a system for distributing a resource.

BACKGROUND OF THE INVENTION

With the development of mobile communications technologies, the 3rd Generation (3G) technology is evolved continuously. High Speed Downlink Packet Access (HSDPA) technology and High Speed Uplink Packet Access (HSUPA) technology are important evolution of the 3G technology. The HSUPA implements high speed uplink data transmission through a series of key technologies, such as 10 ms/2 ms short frame, the physical layer using Hybrid Automatic Repeat reQuest (HARQ), and the quick scheduling to a UE by a Node Base (Node B).

In the HSUPA, Enhanced Dedicated Transport Channel (E-DCH) is used to bear user data, and the E-DCH is categorized into a scheduling E-DCH (configured to bear non-real-time services), and a non-scheduling E-DCH (configured to bear real-time services). As for the scheduling E-DCH, the scheduling grant at the network side determines when the UE may transmit data on the E-DCH. The scheduling grant information Absolute Grant (AG) and the scheduling grant information Relative Grant (RG) are borne respectively through an E-DCH Absolute Grant Channel (E-AGCH) and an E-DCH Relative Grant Channel (E-RGCH). Whether the network side delivers the grant AG or RG is determined by Scheduling Information (SI) reported by the UE and whether the network side is satisfied with a carrier resource distributed to the UE.

In the prior art, only a method for determining whether a resource distributed to a UE on a single carrier is sufficient under a condition of the single carrier is described, and after dual carriers are introduced, no specific solution for determining whether the resource distributed to the UE on the dual carriers is sufficient is given. With the wide application of the dual carriers, determining whether the resource distributed to the UE on the dual carriers is sufficient is a problem to be solved urgently.

SUMMARY OF THE INVENTION

Embodiments of the present invention provide a UE, a method for determining a resource, a method for reporting a resource, and a system for distributing a resource, and specifically provide a technical solution for determining whether a resource distributed to the UE on dual carriers is sufficient.

An embodiment of the present invention provides a method for determining a resource, where the method includes: if transmission data on the carrier reaches maximum transmission data supported in a scope allowed by Service Grant (SG), and a transmission power of the UE is capable of improving a data transmission rate of the carrier, and the carrier and the other one carrier of the dual carriers are incapable of completing transmitting total buffer status data in the same delay period, determining that a resource distributed to a UE on one carrier of dual carriers of the UE is insufficient; otherwise, determining that the resource distributed for the UE on the carrier is sufficient.

An embodiment of the present invention further provides a method for reporting a resource, where the method includes: determining that a resource distributed to a UE on one carrier of dual carriers of the UE is insufficient, if transmission data on the carrier reaches maximum transmission data supported in a scope allowed by SG, a transmission power of the UE is capable of improving a data transmission rate of the carrier, and the carrier and the other one carrier of the dual carriers are incapable of completing transmitting total buffer status data in the same delay period; otherwise, determining that the resource distributed for the UE on the carrier is sufficient; and reporting to a base station whether the resource distributed on the dual carriers is sufficient.

Accordingly, an embodiment of the present invention further provides a UE, where the UE includes: a judging module, configured to respectively judge whether transmission data on each carrier of dual carriers of the UE reaches maximum transmission data supported in a scope allowed by SG, respectively judge whether a transmission power of the UE is capable of improving a data transmission rate of each carrier of the dual carriers, and jointly judge whether each carrier of the dual carriers is incapable of completing transmitting total buffer status data in the same delay period; and a determining module, configured to determine that a resource distributed to the UE on one carrier of the dual carriers of the UE is insufficient, if a judgment result of the judging module is that the transmission data on the carrier reaches the maximum transmission data supported in the scope allowed by the SG, the transmission power of the UE is capable of improving the data transmission rate of the carrier, and the carrier and the other one carrier of the dual carriers are incapable of completing transmitting the total buffer status data in the same delay period; otherwise, determine that the resource distributed for the UE on the carrier is sufficient.

An embodiment of the present invention further provides a system for distributing a resource, where the system includes: a UE, configured to judge whether a resource distributed to the UE on each carrier of dual carriers is sufficient, and report to a base station whether a resource distributed on the dual carriers is sufficient; and a base station, configured to distribute a resource for a corresponding carrier according to content reported by the UE.

According to the embodiments of the present invention, it is determined whether a resource distributed on each carrier is sufficient by judging whether each carrier of dual carriers satisfies relevant conditions. Furthermore, a determination result is reported to a base station, so that the base station determines to distribute a resource for one or two carriers having the insufficient resource of the dual carriers according to the determination result, so as to improve a network transmission performance.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

Embodiments of the present invention provide a UE, a method for determining a resource, a method for reporting a resource, and a system for distributing a resource, and specifically provide a technical solution for determining whether a resource distributed to the UE on dual carriers is sufficient, so as to improve a network transmission performance.

Figure 1:
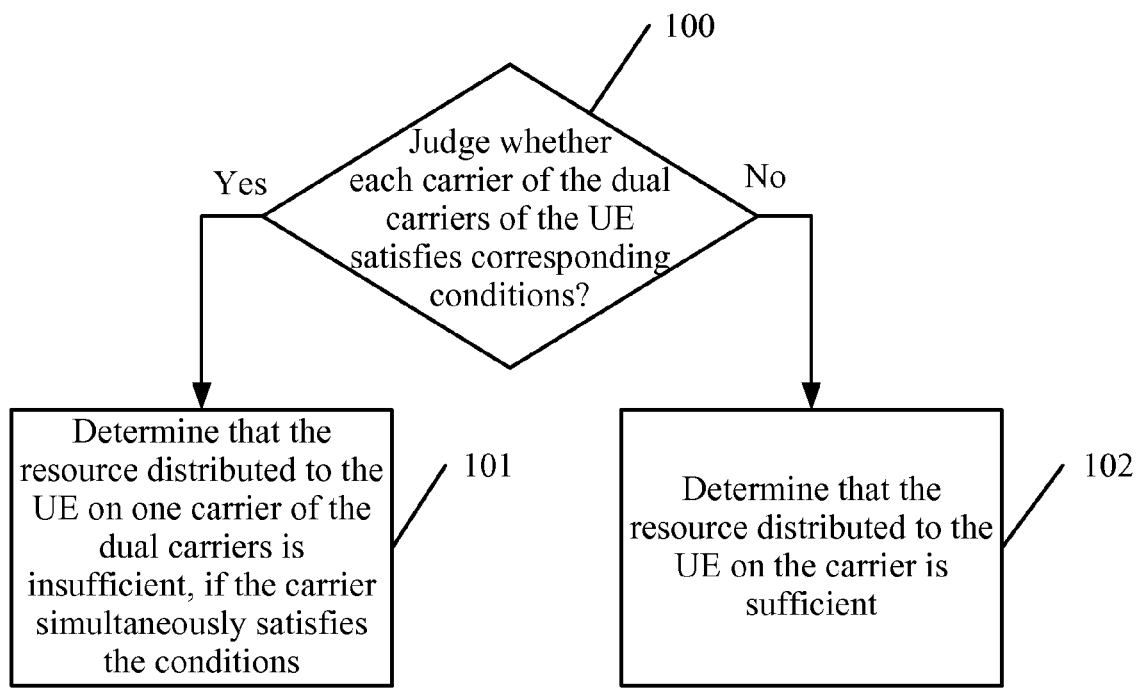
FIG. 1 is a schematic flow chart of an embodiment of a method for determining a resource according to the present invention.

Referring to FIG. 1, it is a schematic flow chart of an embodiment of a method for determining a resource according to the present invention.

The method according to this embodiment includes: determining that a resource distributed to a UE on one carrier of dual carriers of the UE is insufficient, if transmission data on the carrier reaches maximum transmission data supported in a scope allowed by SG, a transmission power of the UE is capable of improving a data transmission rate of the carrier, and the carrier and the other one carrier of the dual carriers are incapable of completing transmitting total buffer status data in the same delay period; otherwise, determining that the resource distributed for the UE on the carrier is sufficient.

Step 100: Judge whether each carrier of the dual carriers of the UE satisfies the following conditions:

the transmission data on the carrier reaches maximum transmission data supported in the scope allowed by the SG;

the transmission power of the UE is capable of improving the data transmission rate of the carrier; and the carrier and the other one carrier of the dual carriers are incapable of completing transmitting the total buffer status data in the same delay period.

Step 101: If one carrier of the dual carriers simultaneously satisfies the above conditions, determine that the resource distributed to the UE on the carrier is insufficient; otherwise, step 102 is performed.

Step 102: Determine that the resource distributed to the UE on the carrier is sufficient.

In specific implementation, judgments for the three conditions have no precedence order, and as long as one condition is not satisfied, it is determined in step 102 that the resource distributed to the UE on the carrier is sufficient; and only when the three conditions are simultaneously satisfied, it is determined in step 101 that the resource distributed to the UE on the carrier is insufficient.

The method for determining a resource according to the embodiment of the present invention may determine whether the resource distributed to the UE on the dual carriers is sufficient, so as to enable a base station to distribute the resource for one or two carriers having the insufficient resource of the dual carriers according to a determination result, so as to improve a network transmission performance.

According to the embodiment, when it is determined whether the resource distributed on each carrier of the dual carriers is sufficient, the three conditions to be satisfied are described. Here, the condition that "the transmission data on the carrier reaches maximum transmission data supported in the scope allowed by the SG" is defined as condition 1, the condition that "the transmission power of the UE is capable of improving the data transmission rate of the carrier" is defined as condition 2, and "the carrier and the other one carrier of the dual carriers are incapable of completing transmitting the total buffer status data in the same delay period" is defined as condition 3. In a specific embodiment, the judgments for satisfying the conditions 1, 2, and 3 have no precedence order, and as long as one of the conditions is not satisfied, other conditions are not judged, and it is directly determined that the resource distributed to the UE on the carrier is sufficient.

A procedure for judging whether each carrier of the dual carriers satisfies each condition is described in detail below with reference to the accompanying drawings.

When the condition 1 is judged, two carriers of the dual carriers are respectively judged, that is, it is judged whether the transmission data on each carrier reaches the maximum transmission data supported in the scope allowed by the SG. More specifically, it is judged whether data selected by E-DCH Transport Format Combination (E-TFC) currently transmitted by each carrier reaches maximum transmission scheduling data supported in the scope allowed by the SG. Furthermore, when a carrier is an inactive status, the carrier may also be regarded to satisfy the condition 1. As for a carrier satisfying the condition 1, it is necessary to judge whether the carrier satisfies the conditions 2 and 3; and as for a carrier not satisfying the condition 1, it is determined that the resource distributed on the carrier is sufficient.

When the condition 2 is judged, judgment results for the two carriers of the dual carriers may be different. In one aspect, as for each carrier, when transmitted minimum Radio Link Control Protocol Data Unit size (RLC PDU size) data is increased, an increased transmission power is different; in another aspect, when a carrier reaches a maximum E-DCH Transport Format Combination Indicator (E-TFCI) supported by the UE, the other one carrier does not reach the E-TFCI. Both the two situations may cause inconsistent judgment results of the two carriers in the condition 2; and therefore, an embodiment of the present invention provides a determination method for the condition 2.

When it is judged whether the dual carriers satisfy the condition 2, the following situations exist. Firstly, it is directly judged whether the condition 2 is satisfied; secondly, it is judged whether the condition 1 is satisfied first; thirdly, it is judged whether the condition 3 is satisfied first; and fourthly, it is judged whether the conditions 1 and 3 are satisfied first. In the following embodiments, it is presumed that it is judged whether the condition 1 is satisfied before it is judged whether the dual carriers satisfy the condition 2, and the following processing manners exist according to the judgment result of the condition 1.

Figure 2:
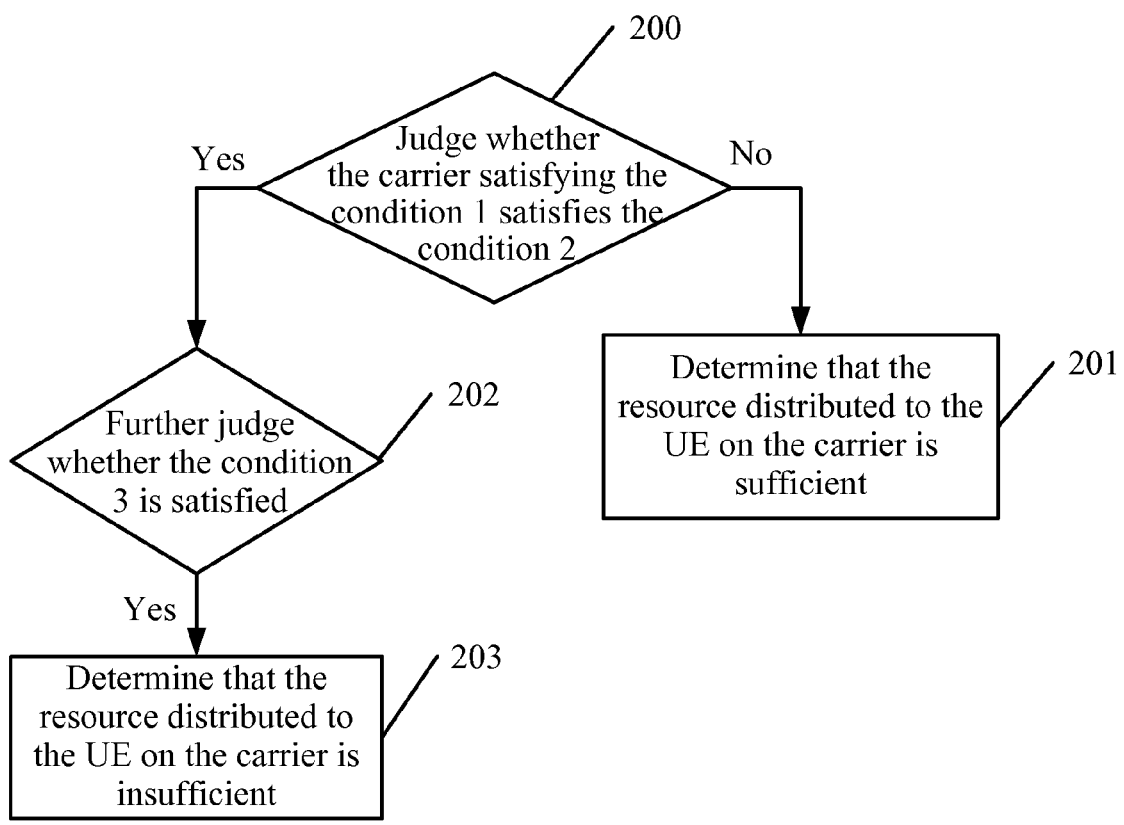
FIG. 2 is a schematic flow chart of another embodiment of a method for determining a resource according to the present invention.

Referring to FIG. 2, it is a schematic flow chart of another embodiment of a method for determining a resource according to the present invention. In this embodiment, it is presumed that it is judged whether the condition 1 is satisfied before it is judged whether the dual carriers satisfy the condition 2, one carrier of the dual carriers does not satisfy the condition 1, and the other one carrier satisfies the condition 1. As for the carrier not satisfying the condition 1, it is determined that the resource distributed on the carrier is sufficient; and therefore it is unnecessary to judge whether the condition 2 is satisfied.

Step 200: It is necessary to judge whether the carrier satisfying the condition 1 satisfies the condition 2 (it is judged whether the condition 2 is satisfied), that is, it is judged whether a UE has a sufficient transmission power to improve a data transmission rate on the carrier. Specifically, if a Medium Access Control (MAC)-i/is entity is configured at a network side, it is judged whether the transmission power of the UE allows transmitting additional 32 bits on the carrier; and if an MAC-e/es entity is configured at the network side, it is judged whether the transmission power of the UE allows transmitting an additional minimum RLC PDU on the carrier. If the carrier does not satisfy the condition 2, step 201 is performed; and if the carrier satisfies the condition 2, step 202 is performed.

It should be noted that, the MAC-i/is and the MAC-e/es are two MAC entities, the differences are that formats of RLC PDUs supported by the two MAC entities are different, the length of the RLC PDU supported by the MAC-i/is is changeable, and the length of the RLC PDU supported by the MAC-e/es is fixed.

Step 201: Determine that the resource distributed to the UE on the carrier is sufficient.

Step 202: Judge whether the condition 3 is satisfied, and only the three conditions are simultaneously satisfied, step 203 is performed.

Step 203: Determine that the resource distributed to the UE on the carrier is insufficient.

Figure 3:
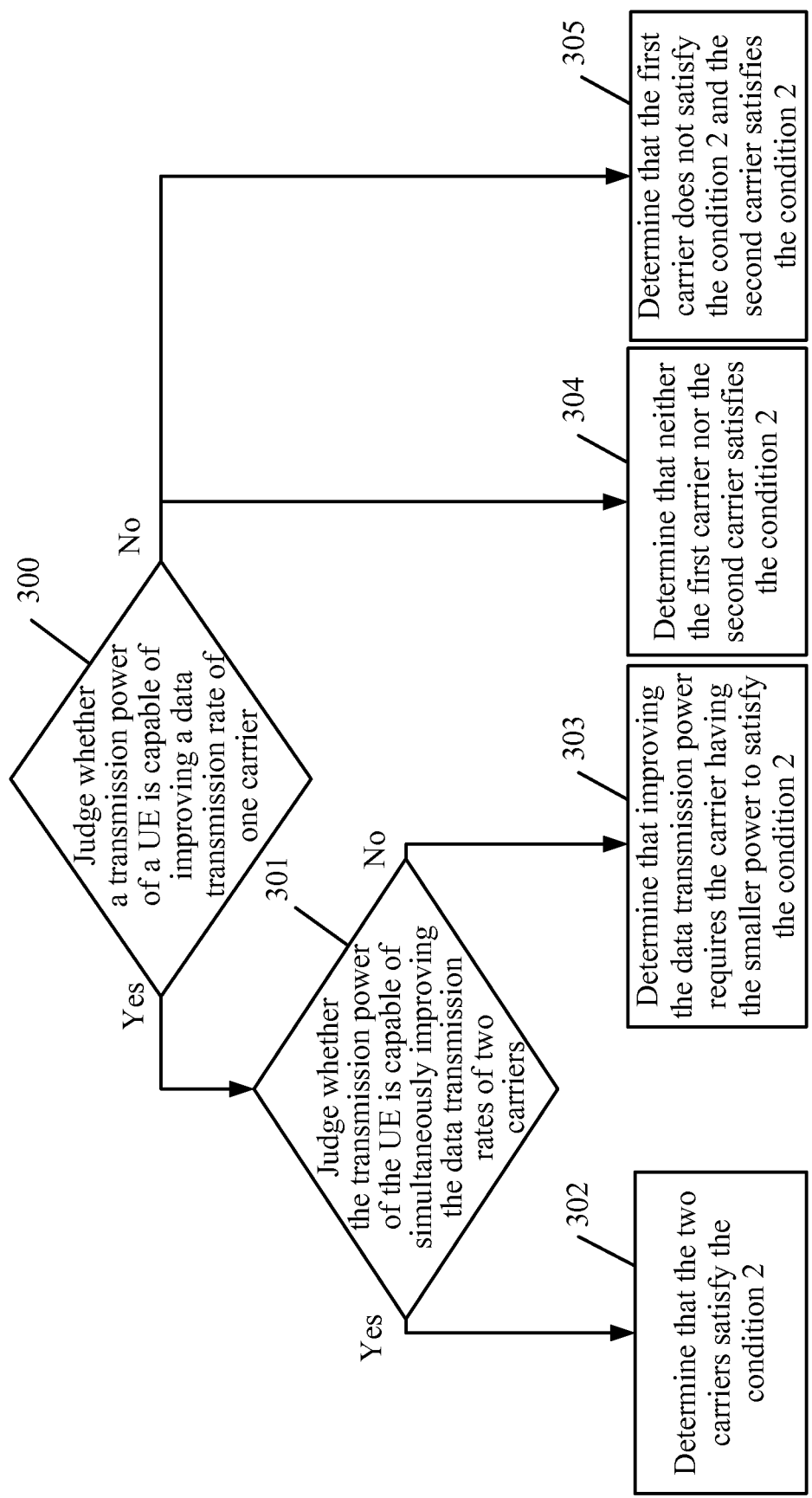
FIG. 3 is a schematic flow chart of still another embodiment of a method for determining a resource according to the present invention.

Referring to FIG. 3, it is a schematic flow chart of still another embodiment of a method for determining a resource according to the present invention. In this embodiment, if two carriers of dual carriers satisfy the condition 1, it is judged respectively whether the two carriers satisfy the condition 2.

Step 300: Respectively presume that a power of one carrier is unchanged, and judge whether a transmission power of a UE is capable of improving a data transmission rate of the other one carrier. Specifically, if an MAC-e/es entity is configured at a network side, it is judged whether the transmission power of the UE allows transmitting an additional minimum RLC PDU on the carrier, and if an MAC-i/is is configured at the network side, it is judged whether the transmission power of the UE allows transmitting additional 32 bits.

Specifically, a power of a first carrier of the dual carriers is fixed, and it is judged whether the transmission power of the UE is capable of improving a data transmission rate of a second carrier; and a power of the second carrier of the dual carriers is fixed, and it is judged whether the transmission power of the UE is capable of improving a data transmission rate of the first carrier.

In Step 300, if the transmission power of the UE is capable of improving the data transmission rate of the second carrier when the power of the first carrier is fixed, and if the transmission power of the UE is capable of improving the data transmission rate of the first carrier when the power of the second carrier is fixed, step 301 is performed.

In Step 300, if it is judged that the transmission power of the UE is not capable of improving the data transmission rate of the second carrier when the power of the first carrier is fixed, and if it is judged that the transmission power of the UE is not capable of improving the data transmission rate of the first carrier when the power of the second carrier of the dual carriers is fixed, step 304 is performed.

In Step 300, if it is judged that the transmission power of the UE is not capable of improving the data transmission rate of the second carrier when the power of the first carrier of the dual carriers is fixed, and if it is judged that the transmission power of the UE is capable of improving the data transmission rate of the first carrier when the power of the second carrier is fixed, step 305 is performed.

Step 301: Judge whether the transmission power of the UE is capable of simultaneously improving the data transmission rate of the first carrier and the data transmission rate of the second carrier. If the judgment result of step 301 is that the transmission power of the UE is capable of simultaneously improving the data transmission rate of the first carrier and the data transmission rate of the second carrier, step 302 is performed; otherwise, Step 303 is performed.

Step 302: Determine that the two carriers satisfy the condition 2, that is, determine that the transmission power of the UE is capable of improving the data transmission rate of the first carrier, and determine that the transmission power of the UE is capable of improving the data transmission rate of the second carrier.

Step 303: Determine that the improving the data transmission rate requires the carrier having the smaller power to satisfy the condition 2. Specifically, if an MAC-e/es entity is configured at a network side, it is determined that the additionally transmitting a minimum RLC PDU requires the carrier having the smaller power to satisfy the condition 2; and if an MAC-i/is is configured at the network side, the additionally transmitting 32 bits requires the carrier having smaller power to satisfy the condition 2.

Step 304: Determine that neither the first carrier nor the second carrier satisfies the condition 2, that is, determine that the resource distributed to the UE on the first carrier and the second carrier is sufficient.

Step 305: Determine that the first carrier does not satisfy the condition 2, that is, determine that the resource distributed to the UE on the first carrier is sufficient; and determine that the second carrier satisfies the condition 2.

When it is judged whether the condition 2 is satisfied, the UE performs the following operations.

If the MAC-i/is is configured at the network side, the UE judges whether the E-TFC has a transmission block having the size being at least 32 bits larger than the size of a transmission block selected by the E-TFC in a Transmission Time Interval (TTI) to which a resource Happy Bit belongs; and if the MAC-e/es is configured, the UE judges whether the E-TFC has a transmission block having the size being at least x bits larger than the size of the transmission block selected by the E-TFC in the TTI to which the resource Happy Bit belongs, in which x indicates a minimum RLC PDU size configured in all logic channels having data and not belonging to a non-scheduling MAC-d flow in a buffer.

The Happy Bit is a single bit, and has two values "Happy" and "Unhappy", which represent whether the UE is satisfied with the resource distributed to the UE itself by a Node B, that is, whether the resource distributed on the corresponding carrier is sufficient. The Happy Bit exists in an uplink E-DCH Dedicated Physical Control Channel (E-DPCCH) of each TTI.

The UE detects whether a status of the E-TFC is "support" according to a power offset used by the E-TFC in the TTI to which the Happy Bit belongs when selecting the transmission data.

The detecting the E-TFC to be the "support" status requires to satisfy the following conditions:
- a channelization code required by the E-TFC is in a span of a maximum channelization code of an E-DCH Dedicated Physical Data Channel (E-DPDCH); and
- the power of the UE can support the E-TFC.

According to the method for determining a resource of the embodiment of the present invention, when it is judged whether the dual carriers satisfy the condition 2, various possible solutions are provided, so as to exclusively determine whether the resource distributed to the UE on the dual carriers is sufficient, so that a base station distributes the resource for one or two carriers having the insufficient resource of the dual carriers according to the judgment result, so as to improve a network transmission performance.

When it is judged whether the dual carriers satisfy the condition 3, the following situations exist. Firstly, it is directly judged whether the condition 3 is satisfied; secondly, it is judged whether the condition 1 is satisfied first; and thirdly, it is judged whether the condition 2 is satisfied first. In the following embodiment, it is presumed that it is directly judged whether the condition 3 is satisfied.

Figure 4:
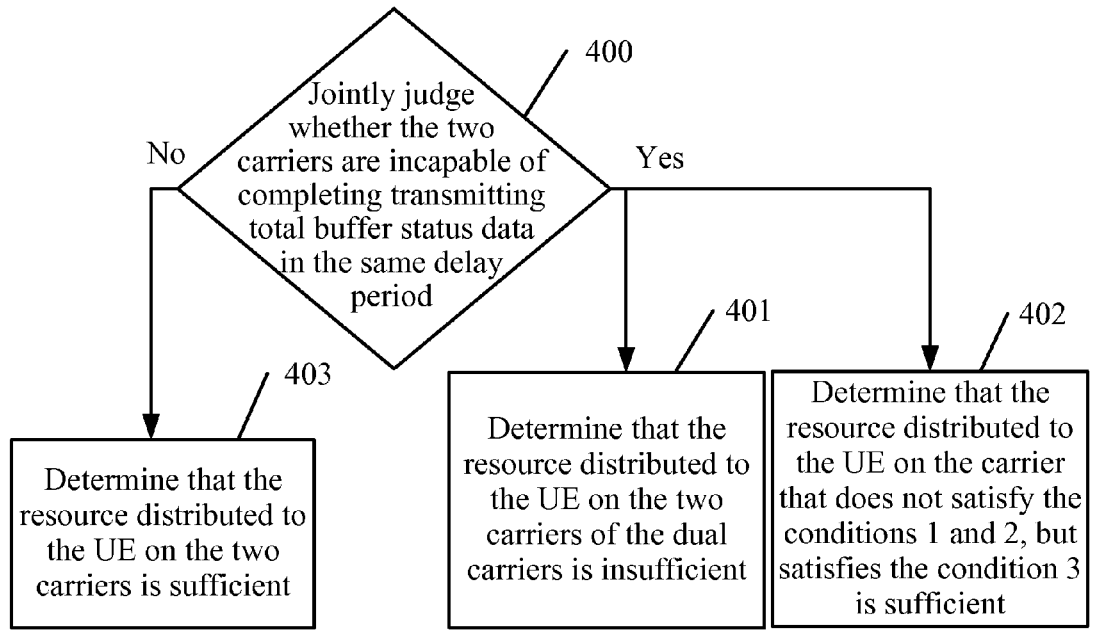
FIG. 4 is a schematic flow chart of yet another embodiment of a method for determining a resource according to the present invention.

Referring to FIG. 4, it is a schematic flow chart of yet another embodiment of a method for determining a resource according to the present invention. In the embodiment of the present invention, it is simultaneously judged whether two carriers of dual carriers satisfy condition 3, that is, in step 400, it is jointly judged whether the two carriers are incapable of completing transmitting total buffer status data in the same delay period.

Specifically, it is judged whether the two carriers are incapable of completing transmitting Total E-DCH Buffer Status (TEBS) data in a resource Happy_Bit_Delay_Condition time (the same Happy_Bit_Delay_Condition is used by the two carriers). The Happy_Bit_Delay_Condition is a Happy Bit delay time configured for an MAC by Radio Resource Control (RRC).

In MAC-e/MAC-i, two carriers share a buffer, that is, are corresponding to a TEBS. Therefore, when it is judged whether the condition 3 is satisfied, each carrier of the dual carriers uses the power offset used to transmit data and selected by the E-TFC in the same TTI during which the Happy Bit is transmitted. It is judged whether all data of the TEBS can be transmitted in the Happy_Bit_Delay_Condition time according to a product result between current SG of each carrier and a proportion of an activation process in all processes (under a situation of 10 ms TTI, the proportion of the activation process is 1:1).

If the dual carriers satisfies the condition 3, and it is determined that the dual carriers satisfy conditions 1 and 2 before, step 401 is performed; if the dual carriers satisfy the condition 3, and it is determined that one carrier of the dual carriers does not satisfy the conditions 1 and 2 before, step 402 is performed; and if the dual carriers do not satisfy the condition 3, step 403 is performed.

Step 401: It is determined that a resource distributed to the UE on the two carriers of the dual carriers is insufficient.

Step 402: It is determined that the resource distributed to the UE on a carrier that does not satisfy the conditions 1 and 2, but satisfies the condition 3 is sufficient.

Step 403: It is determined that the resource distributed to the UE on the two carriers of the dual carriers is sufficient.

According to the method for determining a resource of the embodiment of the present invention, when it is judged whether the dual carriers satisfy the condition 3, various possible solutions are provided, so as to exclusively determine whether the resource distributed to the UE on the dual carriers is sufficient, so that a base station distributes the resource for one or two carriers having the insufficient resource of the dual carriers according to the judgment result, so as to improve a network transmission performance.

Based on the methods for determining a resource according to the foregoing embodiments, an embodiment of the present invention further provides a method for reporting a resource, which includes:
determining that a resource distributed to a UE on one carrier of dual carriers of the UE is insufficient, if transmission data on the carrier reaches the maximum transmission data supported in a scope allowed by SG, a transmission power of the UE is capable of improving a data transmission rate of the carrier, and the carrier and the other one carrier of the dual carriers are incapable of completing transmitting total buffer status data in the same delay period; otherwise, determining that the resource distributed for the UE on the carrier is sufficient; and reporting to a base station whether the resource distributed on the dual carriers is sufficient.

Figure 5:
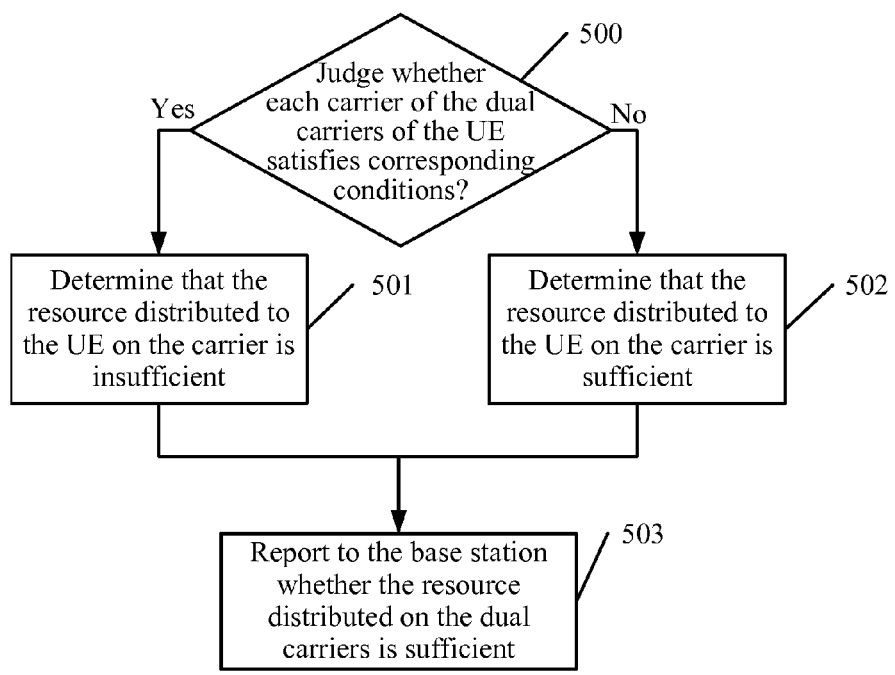
FIG. 5 is a schematic flow chart of an embodiment of a method for reporting a resource according to the present invention.

Referring to FIG. 5, a specific flow includes the following content.

Step 500: Judge whether each carrier of the dual carriers of the UE satisfies the following conditions:
the transmission data on the carrier reaches maximum transmission data supported in the scope allowed by the SG;
the transmission power of the UE is capable of improving the data transmission rate of the carrier; and the carrier and the other one carrier of the dual carriers are incapable of completing transmitting the total buffer status data in the same delay period.

If one carrier of the dual carriers simultaneously satisfies the above conditions, step 501 is performed; and if one carrier of the dual carriers does not simultaneously satisfy the above conditions, step 502 is performed.

Step 501: Determine that the resource distributed to the UE on the carrier is insufficient.

Step 502: Determine that the resource distributed to the UE on the carrier is sufficient.

Step 503: Report to the base station whether the resource distributed on the dual carriers is sufficient.

The UE may report to the base station a situation of whether the resource distributed on the dual carriers is sufficient by carrying the situation in a Happy Bit. Optionally, the situation of whether the resource distributed on each carrier of the dual carriers is sufficient may be carried in two Happy Bits and reported to the base station, or a situation of whether the resource respectively distributed on the two carriers is sufficient is carried in one Happy Bit.

According to the method for reporting a resource of the embodiment of the present invention, a solution for determining whether the resource distributed on the dual carriers is sufficient and reporting the judgment result to the base station is provided, so as to exclusively determine whether the resource distributed to the UE on the dual carriers is sufficient, so that the base station distributes the resource for one or two carriers having the insufficient resource of the dual carriers according to the judgment result, so as to improve a network transmission performance.

Figure 6:
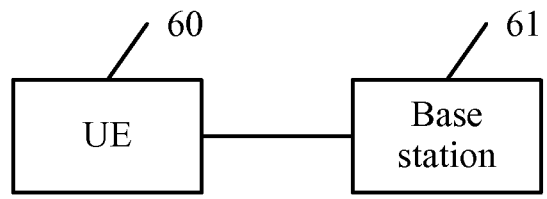
FIG. 6 is a schematic structural diagram of an embodiment of a system for distributing a resource according to the present invention.

Referring to FIG. 6, it is a schematic structural diagram of an embodiment of a system for distributing a resource according to the present invention. The system of this embodiment includes a UE 60 and a base station 61.

The UE 60 is configured to judge whether the resource distributed to the UE 60 on each carrier of dual carriers is sufficient, and report to the base station 61 whether the resource distributed on the dual carriers is sufficient; and the base station 61 is configured to distribute a resource for a corresponding carrier according to content reported by the UE 60.

Specifically, conditions for judging whether the resource distributed to the UE 60 on each carrier is sufficient are as follows:
transmission data on the carrier reaches maximum transmission data supported in a scope allowed by SG;
a transmission power of the UE is capable of improving a data transmission rate of the carrier; and
the carrier and the other one carrier of the dual carriers are incapable of completing transmitting total buffer status data in the same delay period.

If one carrier of the dual carriers simultaneously satisfies the conditions, it is determined that the resource distributed to the UE 60 on the carrier is insufficient; and if one carrier of the dual carriers does not simultaneously satisfy the conditions, it is determined that the resource distributed to the UE 60 on the carrier is sufficient.

Optionally, the UE 60 reports to the base station 61 a determination result of whether the resource distributed on the dual carriers is sufficient by carrying the result in a Happy Bit. Optionally, the UE 60 may report to the base station 61 a situation of whether the resource distributed on each carrier of the dual carriers is sufficient by carrying the situation in two Happy Bits, or may report to the base station 61 a situation of whether the resource respectively distributed on the two carriers is sufficient by carrying the situation in one Happy Bit.

The Happy Bit is a single bit, and has two values "Happy" and "Unhappy", which represent whether the UE is satisfied with the resource distributed to the UE itself by a Node B, that is, whether a resource distributed on a corresponding carrier is sufficient. The Happy Bit exists in transmission of an uplink E-DPCCH of each TTI.

It should be noted that, in the same TTI, an E-DPDCH transmits user data, and the E-DPCCH transmits corresponding control information. The content transmitted by the uplink E-DPCCH is as follows:
Retransmission Sequence Number (RSN): 2 bit
E-TFCI: 7 Bit
Happy Bit: 1 bit, for example, "Happy" is 1, and "Unhappy" is 0; or "Happy" is 0, and "Unhappy" is 1.

According to the system for distributing a resource of the embodiment of the present invention, a solution determining whether the resource distributed on the dual carriers is sufficient and reporting the determination result to the base station is provided, so as to exclusively determine whether the resource distributed to the UE on the dual carriers is sufficient, so that the base station distributes the resource for one or two carriers having the insufficient resource of the dual carriers according to the determination result, so as to improve a network transmission performance.

Figure 7:
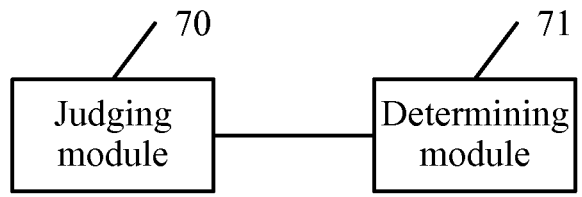
FIG. 7 is a schematic structural diagram of an embodiment of a UE according to the present invention.

Referring to FIG. 7, it is a schematic structural diagram of an embodiment of a UE according to the present invention. The UE of this embodiment includes a judging module 70 and a determining module 71.

The judging module 70 is configured to respectively judge whether transmission data on each carrier of dual carriers of the UE reaches maximum transmission data supported in a scope allowed by SG, respectively judge whether a transmission power of the UE is capable of improving a data transmission rate of each carrier of the dual carriers, and jointly judge whether each carrier of the dual carriers is incapable of completing transmitting total buffer status data in the same delay period.

The determining module 71 is configured to determine that a resource distributed to the UE on one carrier of the dual carriers of the UE is insufficient, if a judgment result of the judging module 70 is that transmission data on the carrier reaches the maximum transmission data supported in the scope allowed by the SG, the transmission power of the UE is capable of improving the data transmission rate of the carrier, and the carrier and the other one carrier of the dual carriers are incapable of completing transmitting the total buffer status data in the same delay period; otherwise, determine that the resource distributed for the UE on the carrier is sufficient.

In specific implementation, three judgments performed by the judging module 70 have no precedence order, and as long as one judgment result is no, the determining module 71 determines that the resource distributed to the UE on the carrier is sufficient; and only the judgment results of the three judgments are yes, the determining module 71 determines that the resource distributed to the UE on the carrier is insufficient.

The UE according to the embodiment of the present invention may determine whether the resource distributed to the UE on the dual carriers is sufficient, so as to enable a base station to distribute a resource for one or two carriers having the insufficient resource of the dual carriers according to the determination result, so as to improve a network transmission performance.

Figure 8:
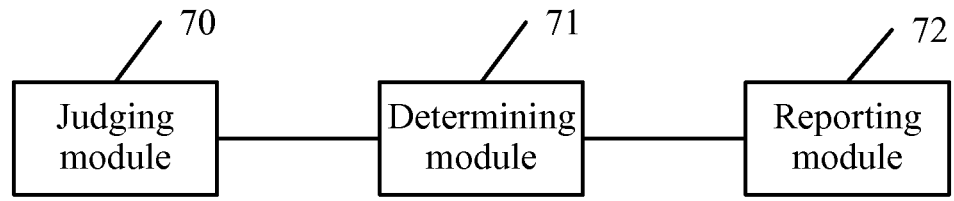
FIG. 8 is a schematic structural diagram of another embodiment of a UE according to the present invention.

Referring FIG. 8, it is a schematic structural diagram of another embodiment of a UE according to the present invention. In addition to the same structure and functions of the UE shown in the previous embodiment and FIG. 7, the UE of this embodiment further includes a reporting module 72, configured to report to a base station whether a resource distributed on dual carriers is sufficient.

Specifically, the UE reports to the base station a situation of whether the resource distributed on the dual carriers is sufficient by carrying the situation in a Happy Bit. Optionally, the situation of whether the resource distributed on each carrier of the dual carriers is sufficient may be carried in two Happy Bits and reported to the base station, or a situation of whether the resource respectively distributed on the two carriers is sufficient is carried in one Happy Bit.

The UE according to the embodiment of the present invention may exclusively determine whether the resource distributed to the UE on the dual carriers is sufficient, and may report the judgment result to the base station through the reporting module, so as to enable the base station to distribute the resource for one or two carriers having the insufficient resource of the dual carriers according to the determination result, so as to improve a network transmission performance.

Figure 9:
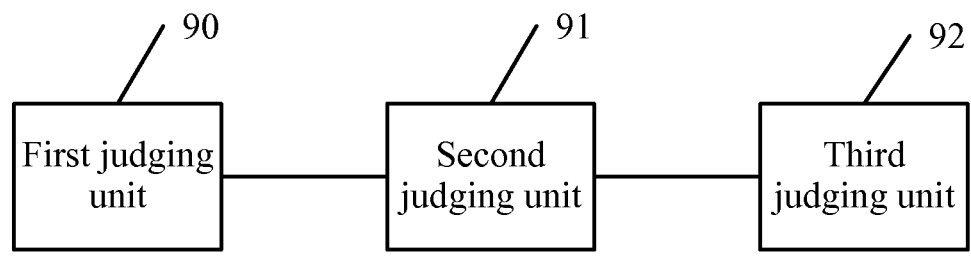
FIG. 9 is a schematic structural diagram of still another embodiment of a UE according to the present invention.

Referring to FIG. 9, it is a schematic structural diagram of still another embodiment of a UE according to the present invention. In this embodiment, a structure and functions of a judging module of the UE are described in detail, and the judging module includes a first judging unit 90, a second judging unit 91, and a third judging unit 92.

The first judging unit 90 is configured to respectively judge whether transmission data on each carrier of dual carriers of the UE reaches maximum transmission data supported in a scope allowed by SG. The second judging unit 91 is configured to respectively judge whether a transmission power of the UE is capable of improving a data transmission rate of each carrier of the dual carriers. The third judging unit 92 is configured to jointly judge whether each carrier of the dual carriers is capable of completing transmitting total buffer status data in the same delay period.

It should be noted that, in specific implementation of the three judging units, judgments for each carrier have no precedence order, and not each carrier needs to be judged once. Specifically, the first judging unit 90 may judge the dual carriers first (respectively judge each carrier of the dual carriers), or the second judging unit 91 may judge the dual carriers first (respectively judge each carrier of the dual carriers), or the third judging unit 92 may judge the dual carriers first (jointly judge each carrier of the dual carriers). As long as one judgment result of the first judging unit and the second judging unit is yes, or a judgment result of the third judging unit is no, a determining module determines that the resource distributed to the UE on the carrier is sufficient. When the judgment results of the first judging unit and the second judging unit are simultaneously yes, and the judgment result of the third judging unit is no, the determining module determines that the resource distributed to the UE on the carrier is insufficient.

The UE according to the embodiment of the present invention may flexibly determine whether the resource distributed to the UE on the dual carriers is sufficient, so as to enable a base station to distribute the resource for one or two carriers having the insufficient resource of the dual carriers according to the determination result, so as to improve a network transmission performance.

Through the above description of the embodiments, it is apparent to those skilled in the art that the present invention may be implemented by software on a necessary universal hardware platform, and definitely may also be implemented by hardware. Based on such understandings, all or part of the technical solution under the present invention that makes contributions to the prior art may be essentially embodied in the form of a software product. The software product may be stored in a storage medium, which can be a Read-Only Memory (ROM), a Random Access Memory (RAM), a magnetic disk, or an optical disk. The software product includes a number of instructions that enable a computer device (personal computer, server, or network device) to execute the methods according to the embodiments of the present invention.

The above descriptions are merely exemplary embodiments of the present invention, but not intended to limit the scope of the present invention. Any equivalent variation made according to the claims of the present invention shall fall within the scope of the present invention.

What is claimed is:

1. A method comprising:
   determining, by a user equipment (UE) configured with multiple carriers, whether a first condition which defines that transmission data on one carrier among the multiple carriers reaches maximum transmission data the one carrier is met;
   determining, by the UE, whether a second condition which defines that transmission power of the UE is capable of improving data transmission rate of the one carrier is met;
   determining, by the UE, whether a third condition which defines that the one carrier together with at least one of other carriers among the multiple carriers are incapable of completing transmitting total buffer status data in a same delay time period is met; and
   determining, by the UE, whether resources allocated to the UE on the one carrier are sufficient in accordance with results of the determining of the first, second, and third conditions;
   wherein in the determining whether the second condition is met, if a Medium Access Control (MAC)-i or MAC-is is configured, the determining determines that the second condition is met in case that the transmission power of the UE allows transmission of at least additional 32 bits on the one carrier.

2. The method of claim 1, wherein, in determining whether the resources allocated to the UE on the one carrier are sufficient, determining, by the UE, that the allocated resources are insufficient in case that all the first, second, and third conditions are met.

3. The method of claim 1, wherein the UE is further configured to report to a network a result of the determination about the allocated resources.

4. The method of claim 1, wherein the multiple carriers is two carriers, and wherein the third condition defines that the total buffer status data requires more than the same delay time period to be transmitted with the current service grant and a current ratio of active processes to a total number of processes on the one carrier plus a product of a current service grant and a current ratio of active processes to a total number of processes on the at least one of the other carriers among the multiple carriers.

5. The method of claim 1, wherein in the third condition, the total buffer status data is transmitted with a product of the current service grant and a current ratio of active processes to a total number of processes on the one carrier plus a product of a current service grant and a current ratio of active processes to a total number of processes on each of the at least one of the other carriers among the multiple carriers.

6. The method of claim 1, wherein the first condition defines that the transmission data on the one carrier reaches the maximum transmission data allowed by the current service grant in E-DCH Transport Format Combination (E-TFC) selection on the one carrier.

7. A user equipment (UE) configured with multiple carriers, the UE comprising:
   a storage medium including executable instructions; and
   a processor,
   wherein the executable instructions, when executed by the processor, cause the UE to:
      determine whether a first condition which defines that transmission data on one carrier among the multiple carriers reaches maximum transmission data allowed by a current service grant on the one carrier is met;

determine whether a second condition which defines that transmission power of the UE is capable of improving data transmission rate of the one carrier is met;

determine whether a third condition which defines that the one carrier together with at least one of other carriers among the multiple carriers are incapable of completing transmitting total buffer status data in a same delay time period is met; and determine whether resources allocated to the UE on the one carrier are sufficient according to a respective result of the determination of the first, second and third conditions;

wherein, if a Medium Access Control (MAC)-I or MAC-is is configured, the executable instructions cause the UE to determine that the second condition is met in case that the transmission power of the UE allows transmission of at least additional 32 bits on the one carrier.

8. The UE of claim 7, wherein the executable instructions, when executed by the processor, cause the UE to determine that the allocated resources are insufficient in case that the first, second, and third conditions are met.

9. The UE of claim 7, the executable instructions, when executed by the processor, further cause the UE to report to a network a result of the determination about the allocated resources.

10. The UE of claim 7, wherein the multiple carriers is two carriers, and wherein the third condition defines that the total buffer status data requires more than the same delay time period to be transmitted with the current service grant and a current ratio of active processes to a total number of processes on the one carrier plus a product of a current service grant and a current ratio of active processes to a total number of processes on the at least one of the other carriers among the multiple carriers.

11. The UE of claim 7, wherein in the third condition, the total buffer status data is transmitted with a product of the current service grant and a current ratio of active processes to a total number of processes on the one carrier plus a product of a current service grant and a current ratio of active processes to a total number of processes on each of the at least one of the other carriers among the multiple carriers.

12. The UE of claim 7, wherein the first condition defines that the transmission data on the one carrier reaches the maximum transmission data allowed by the current service grant in E-DCH Transport Format Combination (E-TFC) selection on the one carrier.

13. A user equipment (UE) configured with multiple carriers, the UE comprising:

non-transitory computer readable storage medium to store instructions, and computer hardware configured, including configured by the instructions, to execute:

determine whether a first condition which defines that transmission data on one carrier among the multiple carriers reaches maximum transmission data allowed by a current service grant on the one carrier is met;

determine whether a second condition which defines that transmission power of the UE is capable of improving data transmission rate of the one carrier is met;

determine whether a third condition which defines that the one carrier together with at least one of other carriers among the multiple carriers are incapable of completing transmitting total buffer status data in a same delay time period is met; and determine whether resources allocated to the UE on the one carrier are sufficient according to results of the determination of the first, second and third conditions;

wherein in determining whether the second condition is met, if a Medium Access Control (MAC)-i or MAC-is is configured, the determining determines that the second condition is met in case that the transmission power of the UE allows transmission of at least additional 32 bits on the one carrier.

14. The UE of claim 13, wherein, in determining whether the resources allocated to the UE on the one carrier are sufficient, determining that the allocated resources are insufficient in case that the first, second, and third conditions are met.

15. The UE of claim 13, wherein the computer hardware is further configured to report to a network a result of the determination about the allocated resources for the UE on the one carrier.

16. The UE of claim 13, wherein the multiple carriers is two carriers, and wherein the third condition defines that the total buffer status data requires more than the same delay time period to be transmitted with the current service grant and a current ratio of active processes to a total number of processes on the one carrier plus a product of a current service grant and a current ratio of active processes to a total number of processes on the at least one of the other carriers among the multiple carriers.

17. The UE of claim 13, wherein in the third condition, the total buffer status data is transmitted with a product of the current service grant and a current ratio of active processes to a total number of processes on the one carrier plus a product of a current service grant and a current ratio of active processes to a total number of processes on at least one of the other carriers among the multiple carriers.

18. The UE of claim 13, wherein the first condition defines that the transmission data on the one carrier reaches the maximum transmission data allowed by the current service grant in E-DCH Transport Format Combination (E-TFC) selection on the one carrier.

19. The method of claim 1, wherein, in determining whether the resources allocated to the UE on the one carrier are sufficient, determining, by the UE, that the allocated resources are sufficient in case that any one of the first, second, and third conditions is not met.

20. The method of claim 1, wherein, in determining whether the second condition is met, if an MAC-e or MAC-es is configured, the determining determines that the second condition is met in case that the transmission power of the UE allows transmission of an additional minimum radio link control (RLC) packet data unit (PDU) on the one carrier.

21. The method of claim 4, wherein the first condition defines that the transmission data on the one carrier reaches the maximum transmission data allowed by the current service grant in E-DCH Transport Format Combination (E-TFC) selection on the one carrier.

22. The UE of claim 7, wherein, the executable instructions, when executed by the processor, cause the UE to determine that the allocated resources on the one carrier are insufficient in case that any one of the first, second, and third conditions is not met.

23. The UE of claim 7, wherein, if an MAC-e or MAC-es is configured, the executable instructions cause the UE to determine that second condition is met in case that the transmission power of the UE allows transmission of an additional minimum radio link control (RLC) packet data unit (PDU) on the one carrier.

24. The UE of claim 9, wherein the first condition defines that the transmission data on the one carrier reaches the maximum transmission data allowed by the current service grant in E-DCH Transport Format Combination (E-TFC) selection on the one carrier.

25. The UE of claim 13, wherein, if an MAC-e or MAC-es is configured, the computer hardware is further configured to determine that second condition is met in case that the transmission power of the UE allows transmission of an additional minimum radio link control (RLC) packet data unit (PDU) on the one carrier.

* * * * *

UNITED STATES PATENT AND TRADEMARK OFFICE
CERTIFICATE OF CORRECTION

PATENT NO. : 9,537,622 B2  
APPLICATION NO. : 14/271995  
DATED : January 3, 2017  
INVENTOR(S) : Yi Zhang et al.

Page 1 of 1

It is certified that error appears in the above-identified patent and that said Letters Patent is hereby corrected as shown below:

On the Title Page

Under Related U.S. Application Data Item (63), please make the following correction:
(63) Continuation of application No. 13/728,231, filed on Dec. 27, 2012, now Pat. No. 8,761,113, which is a continuation of application No. 13/156,613, filed on Jun. 9, 2011, now Pat. No. 9,178,671, which is a continuation of application No. PCT/CN2009/075247, filed on Dec. 1, 2009.

Signed and Sealed this
Thirtieth Day of July, 2019

Andrei Iancu
*Director of the United States Patent and Trademark Office*